United States Patent
Nakamura et al.

(10) Patent No.: US 6,818,241 B2
(45) Date of Patent: Nov. 16, 2004

(54) METHOD FOR PREPARING COOKED RICE

(75) Inventors: Ryoji Nakamura, Kanagawa-ken (JP);
Fumihiko Sano, Kanagawa-ken (JP);
Yoshio Ogata, Kanagawa-ken (JP);
Takeshi Nishinomiya, Kanagawa-ken (JP); Shigeru Toba, Kanagawa-ken (JP)

(73) Assignee: Ajinomoto Co., Inc., Tokyo (JP)

( * ) Notice: Subject to any disclaimer, the term of this patent is extended or adjusted under 35 U.S.C. 154(b) by 731 days.

(21) Appl. No.: 09/765,389

(22) Filed: Jan. 22, 2001

(65) Prior Publication Data

US 2001/0012533 A1 Aug. 9, 2001

(30) Foreign Application Priority Data

Jan. 21, 2000 (JP) .......................................... 2000-013282
Mar. 24, 2000 (JP) .......................................... 2000-084845
Jul. 6, 2000 (JP) .......................................... 2000-205653

(51) Int. Cl.⁷ ................................................. A23L 1/01
(52) U.S. Cl. ........................ 426/508; 426/461; 426/462; 426/510
(58) Field of Search ................................. 426/508, 510, 426/511, 461, 462

(56) References Cited

U.S. PATENT DOCUMENTS 6,056,986 A * 5/2000 Miyagawa et al. ......... 426/510

FOREIGN PATENT DOCUMENTS

JP 3-195465 * 8/1991

OTHER PUBLICATIONS

English translation of Japanese Kokai Patent Application JP 3–195465.*

* cited by examiner

*Primary Examiner*—George C. Yeung
(74) *Attorney, Agent, or Firm*—Oblon, Spivak, McClelland, Maier & Neustadt, P.C.

(57) ABSTRACT

The invention relates to a method of preparing cooked rice, comprising steaming raw rice having a water content of less than 30% by weight and then boiling the steamed rice, to cooked rice prepared according to the present method, and to cooked rice types comprising the cooked rice.

19 Claims, No Drawings

METHOD FOR PREPARING COOKED RICE

BACKGROUND OF THE INVENTION

1. Field of the Invention

The invention relates to a method of preparing cooked rice, to cooked rice prepared according to the method, and to cooked rice types comprising the cooked rice.

2. Discussion of the Background

Cooked rice has traditionally been prepared by various methods. In one method, raw rice is first washed and then soaked in water, and the soaked rice is then placed in a rice cooker and cooked in water by heating (cooker cooking). In another method, raw rice is first washed and soaked in water, the soaked rice steamed and then soaked in hot water, followed by steaming the resulting rice (steam cooking; see for example Japanese Patent Laid-open No. 224661/1984). In yet another method, raw rice is first washed and soaked in water and then steamed, and the steamed rice is then heated with warm water or water in a rice cooker (hybrid cooking; see Japanese Patent Laid-open No. 195465/1991).

Also according to traditional rice cooking methods, washed raw rice is soaked in water for 1–2 hours. When raw rice is not soaked, or soaked for only a short period of time, the resulting cooked rice is not sticky and has a hard core and very poor taste. Such a phenomenon is distinctive of rice cooked in a cooker. Thus, traditionally, a soaking step has been used in rice cooking methods. To prepare cooked rice with a desirable taste and texture, therefore, soaking of the rice in water for a sufficient period of time is carried out. However, since the soaking step lengthens the total preparation time of the cooked rice product, poor production efficiency results when rice is cooked on an industrial scale.

To increase the production efficiency of the rice cooking process, therefore, it is desirable to decrease the total preparation time of the cooked rice, especially when rice is cooked on an industrial scale. This is especially important when frozen rice food products, such as frozen pilaf and Chinese fried rice products suitable for microwave or oven cooking, are prepared on an industrially large scale.

The cooking time of the rice may be shortened by cooking the rice under pressure, or by omitting the soaking step of raw rice in water (non-soak steam cooking; see Japanese Patent Laid-open No. 327617/1995). However, cooking the rice under pressure results in a cooked rice which is excessively sticky, while non-soak steam cooking results in a rice type which is too poorly sticky. Cooked rice having a desirable taste and texture which is suitable for western-style and Chinese-style cooked rice types has not been prepared according to any of the known methods, which is a disadvantage in this industry.

The inventors have overcome the aforementioned disadvantages in the rice cooking industry by omitting the soaking process of raw rice in water. In the present method, raw rice is washed and steamed, preferably immediately after washing, and the steamed rice is then boiled in water. The washing step may be omitted if the rice used is of a type which does not need to be washed (referred to as a wash-free milled rice type hereinafter). The inventors have found that excellent cooked rice suitable for the preparation of western-style and Chinese-style cooked rice types can be prepared by their method. The inventors have also found that cooked rice type having a dry crispness and being suitable for pilaf rice can be recovered by suppressing stickiness essentially required for general plain cooked white rice.

Some advantages associated with the present method are that large-scale soaking equipment is unnecessary, resulting in a saving of space in the rice production facility, as well as a reduction in the amount of water discharged from the facility.

Prior to the present invention, there were no known methods for preparing cooked rice having the desired stickiness and fluffiness and a texture (crispness) suitable for the preparation of western-style and Chinese-style cooked rice types such as pilaf, Chinese fried rice, dry curry, paella, and buttered rice with chicken (chicken rice), on an industrially large scale and with a short cooking time.

In such circumstances, there has been a need for the development of a method for preparing cooked rice suitable for use in the preparation of the aforementioned cooked rice types.

SUMMARY OF THE INVENTION

Accordingly, it is an object of this invention to overcome the disadvantages of the known methods of preparing cooked rice which is suitable for western-style and Chinese-style cooked rice types. More specifically, the present invention provides an efficient method for cooking rice which omits the time-consuming step of soaking the rice in water, and which provides cooked rice having grains which adhere weakly to each other and a stickiness and fluffiness which are suitable for the preparation of western-style and Chinese-style cooked rice types.

In one embodiment of the invention, a method of preparing cooked rice comprising steaming raw rice having a water content of less than 30% by weight and then boiling the steamed rice is described.

In an alternative embodiment, cooked rice prepared by the present method is described.

In an alternative embodiment, a cooked rice type comprising the cooked rice prepared by the present method is described.

DETAILED DESCRIPTION OF THE INVENTION

In accordance with the invention, cooked rice having the desired quality for the preparation of western-style and Chinese-style cooked rice types such as pilaf, Chinese fried rice, dry curry, paella and chicken rice, can be prepared on an industrially large scale in a short period of time by omitting the soaking process of raw rice.

In accordance with the invention, raw rice is washed and steamed, preferably immediately after washing, and the steamed rice is then boiled in water. The washing step may be omitted if wash-free milled rice is used. The rice grains of the resulting cooked rice have poor adhesivity to each other, and are therefore dry and crisp but appropriately sticky.

As used herein, the term "wash rice" means a type of rice which needs to be washed.

As used herein, the term "wash-free milled rice" means a type of rice which does not need to be washed.

As used herein, the term "raw rice" means milled rice (raw material rice) washed under agitation in sufficient volume of water or warm water to a final state with no rice bran or contaminants therein, and which is not yet steamed or boiled. Further, the raw rice may include the wash-free milled rice described above.

In accordance with the invention, any cultivars of rice can be used without specific limitation, and includes any nonglutinous rice, glutinous rice, low amylose rice or high amylose rice. The water content of the rice used is from 12 to 17% by weight. This range includes all specific values and subranges there between, such as, but not limited to, 12.5, 13, 13.5, 14, 14.5, 15 and 16% by weight. If necessary, additionally, appropriate amounts of barley and the like may satisfactorily be mixed with such rice for use.

As used herein, the term "water content" means a ratio (% by weight) determined by heating a rice sample and vaporizing water therein at drying process under heating at atmospheric pressure, measuring the difference in weight between prior to and after drying to calculate the volume of water in the sample and calculating the ratio of the volume to the sample prior to drying. To prevent the sample from turning heterogeneous, the sample was sufficiently mixed together under agitation and then collected.

The water content of the raw rice is less than 30% by weight, preferably 14 to 29% by weight, more preferably 20 to 26% by weight, still more preferably 21 to 24% by weight. These ranges include all specific values and subranges there between, such as, but not limited to, 14.5, 14.75, 15, 16, 18, 20, 22, 25 and 27% by weight. When the water content of raw rice is more than 30% by weight, the adhesivity of the resulting cooked rice is enhanced. To avoid the enhancement, the water content should be selected to be less than 30% by weight. To prepare cooked rice which is not too hard, a water content of more than 14% by weight is preferably selected.

As used herein, the term "soaking process" means a process of soaking raw rice in water or warm water for one to 2 hours to allow the raw rice to absorb water sufficiently to a final water content of 30 to 36% by weight.

Appropriate conditions for the steaming process (temperature, length of steaming, etc.) can be selected by those of ordinary skill in the art without undue experimentation. For example, a steam temperature of from 90 to 100° C. can be used, while the steaming time varies depending on the steaming temperature. This temperature range includes all specific values and subranges there between, such as, but not limited to 91, 91.5, 92, 93, 94, 95, 97 and 99° C. The steaming time is generally about 10 to 30 minutes. This range includes all specific values and subranges there between, such as, but not limited to 11, 12, 13, 14, 16, 18, 20, 22, 23, 26 and 29 minutes. The steamed rice is preferably at a water content of 20 to 30% by weight and with a gelatinization degree of 15 to 35%, more preferably at a water content of 25 to 30% by weight and with a gelatinization degree of 18 to 30%. These water content ranges includes all specific values and subranges there between, such as, but not limited to 21, 22, 23, 24, 25, 26, 27, 28 and 29% by weight. These ranges of gelatinization degree include all specific values and subranges there between, such as, but not limited to 16, 17, 18, 19, 20, 22, 24, 26, 27, 27, 31 and 33%. The gelatinization degree was measured according to the β-amylase pullulanase method (see *J. Jpn. Soc. Starch Sci.*, 28, 235 (1981)).

Appropriate conditions for cooking the rice (temperature, water volume, etc.) can be selected by those of ordinary skill in the art without undue experimentation. Methods generally used for cooking rice including heating conditions may satisfactorily be used. For cooking the rice, water (preferably water at for example 50° C. or more, more preferably at about 70 to 80° C.) is then added at a volume ratio to rice to be cooked according to general rice cooking methods This temperature range includes all specific values and subranges there between, such as, but not limited to 55, 58, 60, 65, 75 and 78° C. Otherwise, the water is at a slightly less volume or at a slightly more volume. Depending on the rice species or the final product type, the volume of water can appropriately be selected. Per 100 parts by weight of rice (raw rice or wash-free milled rice if used), water is additionally added preferably at about 100 to 140 parts by weight (water content of cooked rice at 56 to 67% by weight) and more preferably at about 120 to 130 parts by weight (water content of cooked rice at 60 to 64% by weight) to the steamed rice. These ranges include all specific values and subranges there between, such as, but not limited to 101, 105, 110, 115, 125 and 135 parts by weight. In accordance with the invention, cooked rice with appropriate stickiness and fluffiness and a texture suitable for western-style and Chinese-style cooked rice types such as pilaf, Chinese fried rice, dry curry, paella and chicken rice, even when the volume of water added is at 140 parts by weight (water content of cooked rice at 67% by weight), can be prepared in an efficient way and with increased yield compared to traditional rice cooking methods.

The container for rice cooking is with no specific limitation but a rice cooker can be used as the container. Rice cooking in water is satisfactorily performed in a rice cooker. Herein, the rice cooking process comprises a boiling step of swelling the rice under heating in a rice cooker thereby gelatinizing the rice and simultaneously changing the starch in the rice into α-type, a baking step of additionally heating the rice when water in the cooker is absorbed in the rice, and a subsequent steaming step of leaving the rice to stand alone while the lid of the cooker remains on. Any means or any known methods routinely used as rice cooking methods can be used therefor. More specifically, the time required for the elevation of the temperature of the product to 100° C. at the boiling process can be set at 5 minutes to 20 minutes. This range includes all specific values and subranges there between, such as, but not limited to 6, 7, 9, 10, 12, 15, 17 and 19 minutes.

The cooked rice produced by the present method is dry and crisp because of poor adhesion between rice grains, and having a particularly suitable texture for western-style and Chinese-style cooked rice types such as pilaf, Chinese fried rice, dry curry, paella and chicken rice and still having appropriate stickiness and fluffiness.

To prepare pilaf, Chinese fried rice, dry curry, paella and chicken rice, the necessary cooking materials and seasonings are added at any of the steps during the rice cooking process, or after the rice is boiled. For example, rice is steamed and boiled according to the present method and, subsequently, appropriate seasonings for the desired cooked rice type are added. For pilaf, for example, necessary ingredients are added to the cooked rice to generate the pilaf taste. In such manner, pilaf can completely be prepared.

The various western-style and Chinese-style cooked products such as pilaf, Chinese fried rice, dry curry, paella and chicken rice, made using rice prepared by the present invention, are also encompassed within the cooked rice types prepared in accordance with the invention.

The pilaf, Chinese fried rice, dry curry, paella and chicken rice thus prepared have particularly highly dry and crisp touch on the tongue. Because the inventive method comprises cooking after an optional rice washing process (the process can be omitted for wash-free milled rice) (the soaking process can substantially be omitted) and a subsequent steaming process, foods produced by methods for preparing cooked rice types, at least comprising the two processes, namely the steaming process and the boiling process, in this sequence, are all encompassed within the products prepared by the inventive method, namely the inventive products. Furthermore, fats and oils may satisfactorily be added during these two processes according to the methods described in Japanese Patent Laid-open Nos. 55167/1981, 275437/1984 and 91844/1993. Preferably, fats and oils are added after the steaming process. Products necessary for intermediate products and final products (foods in final forms), which are produced by a processing process and a cooking process and the like in addition to the two processes essential for the invention, are also encompassed within the products produced by the inventive method, as long as the products have no adverse influence on the advantages or purposes of the invention. Therefore, cooked rice types recovered in accordance with the invention can be used for preparing various cooked products and foods or can be contained in such various cooked products and foods. It is needless to say that the resulting cooked products and foods are also encompassed within the scope of the invention.

Because the cooked rice types prepared in accordance with the present invention are suitable for frozen foods, the cooked rice types can be stored in such frozen states for use. As the freezing method in such case, general methods for preparing frozen foods including individuated quick-freezing methods described in for example Japanese Patent Laid-open Nos. 105847/1975 and 44857/1988 can be used.

EXAMPLES

Having generally described this invention, a further understanding can be obtained by reference to specific examples which are provided herein for purposes of illustration only and are not intended to be limiting unless otherwise specified.

Example 1

Milled raw rice (3 kg) prepared by milling the brown rice of the brand Mutsuhomare produced in 1998 (cultivated region: Aomori in Japan) was weighed and washed for 2.5 minutes according to a conventional methods, followed by water draining for 10 minutes. The water content of the rice (raw rice) after water draining was measured as 22.1% by weight. Subsequently, the rice after water draining was charged in a Chinese-style steamer (square type of 400 mm×400 mm), under purging of steam at about 100° C. from the underneath for steaming for 20 minutes. The steamed rice was at a water content of 27.2% by weight. Subsequently, the steamed rice [about 600 g (500 g on a milled rice weight basis)] was weighed, followed by addition of 120 parts by weight of water at 80° C. per 100 parts by weight on a milled rice basis, 1.8 parts by weight of edible salt, 0.14 part by weight of pepper, 0.26 part by weight of sodium glutamate and 0.9 part by weight of consommé as pilaf seasoning per 100 parts by weight on a milled rice basis, and 2.3 parts by weight of salad oil per 100 parts by weight on a milled rice basis; and the resulting mixture was boiled in an electric rice cooker for 20 minutes. Subsequently, the rice was steamed for 15 minutes, while the rice was retained at 90° C. or more. The cooked rice after completion of steaming was at a water content of 62.1% by weight.

Example 2

Wash-free milled rice (at water content of 15.6% by weight; 3 kg) prepared from the rice of the brand Mutsuhomare produced in 1998 (cultivated region: Aomori in Japan) was weighed and charged in a Chinese steamer (square type; 400 mm×400 mm), under purging of steam at about 100° C. from the underneath for steaming for 20 minutes. The steamed rice (steamed rice) was at a water content of 20.1% by weight. Subsequently, the steamed rice [about 540 g (500 g on a milled rice weight basis)] was weighed, followed by addition of 140 parts by weight of water at 80° C. per 100 parts by weight on a (milled) rice basis, 1.8 parts by weight of edible salt, 0.14 part by weight of pepper, 0.26 part by weight of sodium glutamate and 0.9 part by weight of consommé as pilaf seasoning per 100 parts by weight on a milled rice basis, and 2.3 parts by weight of salad oil per 100 parts by weight on a milled rice basis; and the resulting mixture was boiled in an electric rice cooker for 20 minutes. Subsequently, the rice was steamed for 15 minutes while the rice was retained at 90° C. or more. The cooked rice after completion of steaming was at a water content of 60.0% by weight.

The properties of the rice types recovered above were determined, using a tensipressor ("My Boy" manufactured by Taketomo Electric Machine, Co., Ltd.). The method for determining the properties comprised placing one grain of cooked rice on a sample table, measuring the thickness of the grain of cooked rice with a plunger (18 mmφ) each time, and then measuring the load required for compressing the thickness to 25% (low-pressure compression one byte) and 85% (high-pressure compression two byte) thereof. Based on the resulting chart (see Table 1), the adhesion (—H2) and stickiness (A6) were determined. The mean values thereof concerning 30 cooked rice grains are shown in Table 2.

TABLE 1

A chart (an example of one grain method pattern) of the load on the cooked rice grain used in Example 1, and shows an analysis of cooked rice with low-pressure compression (25% compression) and high-pressure compression (85% compression) by a 2-byte method:

| Items | Indicators | Note |
| --- | --- | --- |
| Hardness | H2 | harder at a larger value |
| Elasticity | (A4 + A5)/(A1 + A2) | stronger at a larger value |
| Flexibility | H2/H1 | flexible at a larger value |
| Adhesion | −H2 | stronger at a larger value |
| Stickiness | A6 | stronger at a larger value |
| Fragile property | A4/A5 | fragile at a larger value |

H1, H2, −H1, −H2: peak values
A1 to A6: area
L1 to L6: distortion level (mm)

In the same manner as in Example 1, without any modification, except that rice washed and soaked for 2 hours was steamed to weigh and use the resulting rice of about 670 g (500 g on a milled rice basis) and that 100 parts by weight of warm water were used per 100 parts by weight on a milled rice basis, cooked rice (Comparative Example 1) was prepared. The properties thereof were determined in the same manner as described above. The results are shown in Table 2.

TABLE 2

| Samples | Adhesivity (dyn) | Stickiness (erg) |
| --- | --- | --- |
| Example 1 | 1.20 × 10$^5$ | 1.51 × 10$^5$ |
| Example 2 | 0.68 × 10$^5$ | 0.53 × 10$^5$ |
| Comparative Example 1 | 1.75 × 10$^5$ | 2.26 × 10$^5$ |

As shown in Table 2, the inventive product was at far lower degrees of adhesivity and stickiness, compared with the comparative product. It was verified that compared with the comparative product, the inventive product was very tasty with excellent texture, when materials necessary for pilaf were added to the inventive product to prepare pilaf.

Example 3

Cooked rice prepared by cooking according to the inventive method (Example 1) was mixed with dry ice pulverized into powder under agitation, for individuated quick-freezing to recover a product (Example 3). Alternatively, cooked rice prepared by cooking according to the method disclosed in Japanese Patent Laid-open No. 327617/1995 was subjected to individuated quick-freezing in the same manner, to recover a product (Comparative Example 2). Specifically, the comparative product was prepared by subjecting raw rice to steaming for 12 minutes in the same manner as in Example 1, subsequently soaking the total volume of the steamed rice in hot water at 90° C. for 4 minutes, draining water for about 15 seconds, charging again and steaming the resulting rice in the same steamer for 12 minutes, adding the same kind and quantity of pilaf seasonings as in Example 1 and salad oil to recover cooked rice (Comparative Example 2 prior to freezing), mixing the cooked rice with dry ice pulverized into powder under agitation and subjecting the mixture to individuated quick-freezing (Comparative Example 2).

Individual samples (250 g each) of the frozen products were placed in a microwave oven for heating at 600 W for 5 minutes, from which the samples were taken out and left to stand at ambient temperature for 3 minutes. In a sensory test (n=8), dry crispness as well as stickiness were evaluated to assess the preference of the resulting samples for western-style cooked rice, concerning stickiness and fluffiness suitable for pilaf. As a control in the sensory test, the cooked rice of Comparative Example I was used, after freezing and heating in a microwave oven. The results are shown in Table 3.

The assessment was carried out by eight panelists, and the properties of the rice were ranked in 5 grades as shown on average score, while the control was defined as score 0. Concerning the degrees of dry crispness and stickiness, the assessment scores were defined as follows:

score 2: strong score 0: identical to control score −2: weak.

Concerning the preference of overall texture, the assessment scores were defined as follows:

score 2: preferable score 0: identical to control score −2: not preferable.

As shown in Table 3, the inventive product (Example 3) had preferable texture, but the product of Comparative Example 2 was too poorly sticky, with the resulting absence of preferable texture.

TABLE 3

| Samples | Dry crispness degree | Stickiness degree | Preference of overall texture |
|---|---|---|---|
| Example 3 (invention) | 0.5 | −0.1 | 0.3 |
| Comparative Example 2 | 1.5 | −1.3 | −0.3 |
| Control Product | 0.0 | 0.0 | 0.0 |

Example 4

Pilaf was produced according to the following method:

To the cooked rice recovered in Example 1 were added 54 parts by weight in total of preliminarily prepared shrimp and vegetables (onion, carrot, kidney bean, green pepper, sweet corn and mushroom) per 100 parts by weight on a milled rice basis, to prepare shrimp pilaf. With or without individuated quick-freezing, the resulting shrimp pilaf was dry and crisp, with weak adhesivity of rice grain to each other, and the resultant preferable texture.

Having now fully described this invention, it will be apparent to one of ordinary skill in the art that many changes and modifications can be made thereto without departing from the spirit or scope of the invention as set forth herein.

This application is based on (a) Japanese Patent Application No. 13282/2000, filed Jan. 21, 2000, (b) Japanese Patent Application No. 84845/2000, filed Mar. 24, 2000, and (c) Japanese Patent Application No. 205653/2000, filed Jul. 6, 2000, the entire contents of which are hereby incorporated by reference herein, the same as if they were fully set forth at length.

What is claimed as new and desired to be secured by Letters Patent of the United States is:

1. A method of preparing cooked rice, comprising steaming raw rice having a water content of less than 30% by weight and then boiling the steamed rice with the proviso that the raw rice is not soaked in water prior to said steaming.

2. A method according to claim 1, wherein the raw rice has a water content of from 14 to 29% by weight.

3. A method according to claim 1, wherein the raw rice has a water content of from 20 to 26% by weight.

4. A method according to claim 1, wherein the raw rice has a water content of from 21 to 24% by weight.

5. A method according to claim 1, wherein the raw rice is a wash rice type.

6. A method according to claim 1, wherein the raw rice is a wash-free milled rice type.

7. A method according to claim 1, wherein the raw rice is steamed for a period of from 10 to 30 minutes.

8. A method according to claim 1, wherein the raw rice is steamed at a temperature of from 90 to 100° C.

9. A method according to claim 1, wherein water at a temperature of 50° C. or more is added to the steamed rice before boiling.

10. A method according to claim 1, wherein water at a temperature of from 70 to 80° C. is added to the steamed rice before boiling.

11. A method according to claim 1, further comprising adding a seasoning to the rice during steaming or boiling, or during both steaming and boiling, or to the rice obtained after said method.

12. A method according to claim 11, wherein the seasoning is a seasoning used in pilaf, Chinese fried rice, dry curry, paella or buttered rice with chicken.

13. A method according to claim 1, further comprising steaming the rice after boiling.

14. A method according to claim 13, wherein the boiled rice is steamed at a temperature of 90° C. or more.

15. A method according to claim 1, wherein the steamed rice before boiling has a gelatinization degree of from 15 to 35%.

16. A method according to claim 1, wherein the steamed rice before boiling has a gelatinization degree of from 18 to 30%.

17. Cooked rice prepared according to the method of claim 1.

18. A cooked rice product comprising the cooked rice of claim 17.

19. A cooked rice product according to claim 18 which is selected from the group consisting of pilaf, Chinese fried rice, dry curry, paella and buttered rice with chicken.

* * * * *